United States Patent
Lee et al.

(10) Patent No.: US 8,381,996 B1
(45) Date of Patent: Feb. 26, 2013

(54) MEMORY CARD SUPPORTING NEAR FIELD COMMUNICATION THROUGH SINGLE WIRE PROTOCOL

(75) Inventors: Darren Tien-Chi Lee, Taichung (TW); Cheng Ying Cho, Taichung (TW); Jeng Lung Li, Taichung (TW); Tzu Hsiu Liu, Taichung (TW); Shiu Wing Hui, Taichung (TW)

(73) Assignee: GOTrust Technology Inc., Taichung (TW)

( * ) Notice: Subject to any disclaimer, the term of this patent is extended or adjusted under 35 U.S.C. 154(b) by 0 days.

(21) Appl. No.: 13/294,185

(22) Filed: Nov. 11, 2011

(30) Foreign Application Priority Data

Sep. 8, 2011 (TW) .............................. 100216861 A

(51) Int. Cl.
*G06K 19/06* (2006.01)
(52) U.S. Cl. ....................................................... 235/492
(58) Field of Classification Search .................. 235/379, 235/487, 492; 455/558
See application file for complete search history.

(56) References Cited

U.S. PATENT DOCUMENTS

| | | | |
|---|---|---|---|
| 7,558,110 B2 * | 7/2009 | Mizushima et al. ..... | 365/185.04 |
| 8,272,573 B2 * | 9/2012 | Hartel ............................ | 235/492 |
| 8,282,009 B2 * | 10/2012 | Ahn et al. ..................... | 235/492 |
| 2005/0224589 A1 * | 10/2005 | Park et al. ..................... | 235/492 |
| 2005/0252978 A1 * | 11/2005 | Nishizawa et al. ........... | 235/492 |
| 2011/0084149 A1 * | 4/2011 | Faith et al. .................... | 235/492 |
| 2012/0260119 A1 * | 10/2012 | Garnier et al. ................ | 713/340 |
| 2012/0298760 A1 * | 11/2012 | Li et al. ......................... | 235/492 |

* cited by examiner

*Primary Examiner* — Seung Lee
(74) *Attorney, Agent, or Firm* — Lin & Associates IP, Inc.

(57) ABSTRACT

A memory card supporting near field communication through single wire protocol includes a power management unit, an interface control unit, a data storage unit, a power protection unit and an intelligent unit. The power protection unit is interposed between the power management unit and a near field voltage source of the near field communication unit to prevent short-circuit induced by direct connection there between. Moreover, direct connection between the power management unit and the intelligent unit can also be prevented, which can protect against bursts of excessive voltages or currents that may damage the data in the intelligent unit. Additionally, the power protection unit can prevent power leakage from the power management unit and the near field voltage source, which solves the problem of improperly driving near field communication or insufficient power supply to the interface control unit or intelligent unit.

6 Claims, 1 Drawing Sheet

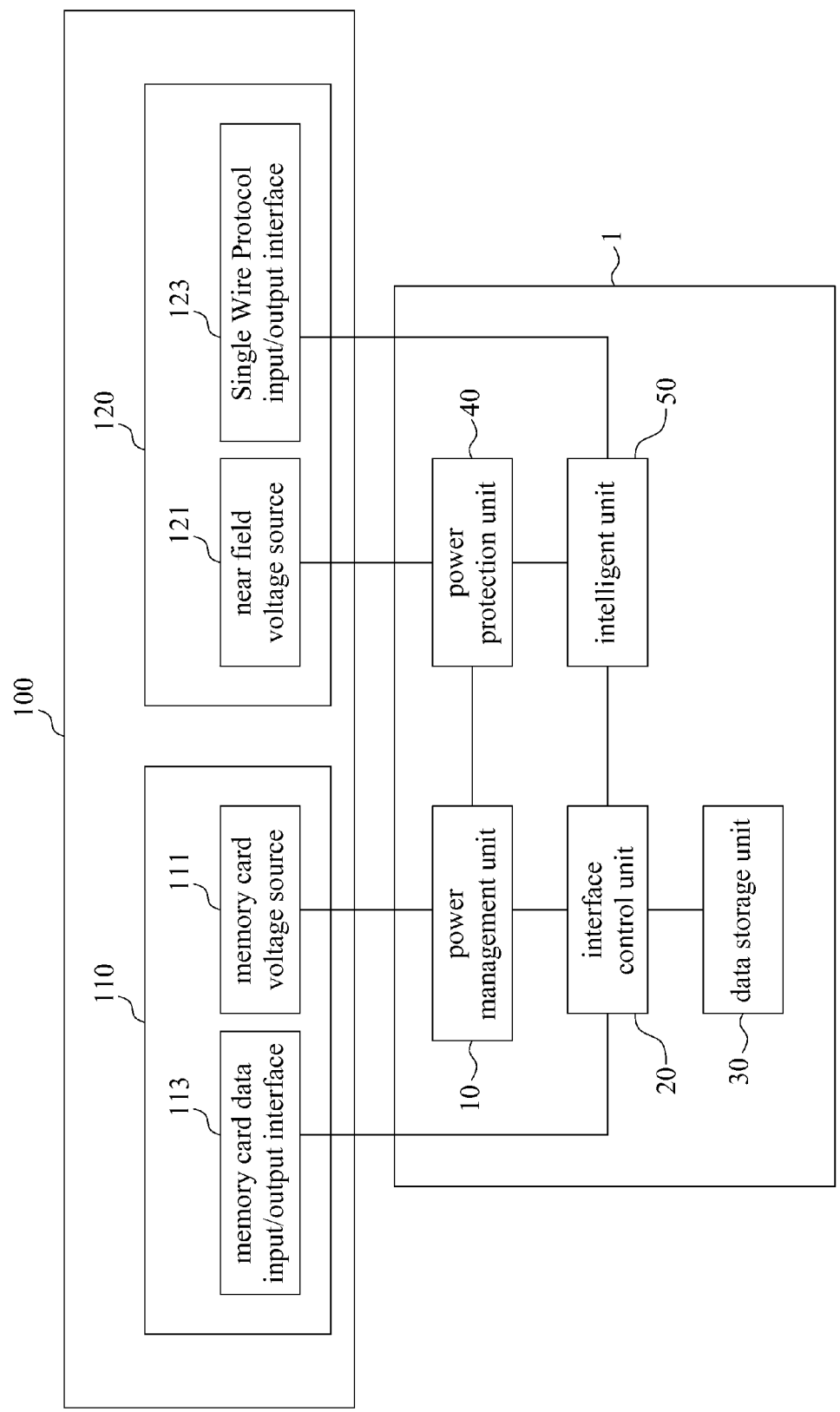

MEMORY CARD SUPPORTING NEAR FIELD COMMUNICATION THROUGH SINGLE WIRE PROTOCOL

BACKGROUND OF THE INVENTION

1. Field of the Invention

The present invention relates to a memory card used in near field communication through single wire protocol (SWP), and more particularly to a memory card that includes a power protection unit that prevents short-circuits and power leakage between a power management unit and the SWP connection points.

2. The Prior Arts

Mobile phones are widely used electronic devices. As technology advances, the mobile phone is provided with more functions such as voice recording, video recording, photo shoot, etc. To accommodate the increasing functions, adequate memory cards are also required for data storage in the mobile phone.

Digital wallets are also becoming increasingly popular, such as debit cards used for small amount payments. The debit card uses magnetic induction to proceed to near field communication. In particular, the card can include a chip that may be powered by an external near field communication device to proceed to storage, debit and like transactions.

In this context, a current trend is the development of near field communication (NFC) mobile phones that integrate near field communication functionality in the traditional mobile phone to proceed to small amount payments. To ensure that the consumer's data are kept safe, security components are required in the NFC mobile phones. Presently, the NFC mobile phone provided by the company Google uses a Single Wire Protocol (SWP) SIM card as the security component. However, banks cannot write personalized data in the SWP SIM card. Accordingly, memory cards supporting SWP are developed for use in NFC mobile phones.

However, the voltage supply of the memory card is usually connected directly with the power source of the electronic product, which may result in the near field communication chip being easily connected directly with the voltage source. As a result, short-circuits may occur, which may damage secure data and even damage the memory card or electronic product. Moreover, because the near field communication chip and the power source of the electronic product are directly conducting, power leakage may happen, which results in insufficient driving power and incapability of driving the near field communication or the memory card.

Therefore, there is a need for a design that prevents short circuit between the connection port of the near field communication chip and the power source, as well as power leakage.

SUMMARY OF THE INVENTION

An aspect of the present invention is to provide a memory card supporting near field communication through the Single Wire Protocol (SWP). The memory card is mainly used in a near field communication device, such as a mobile phone, a camera, a multimedia player, a tablet computer, etc. The memory card comprises a power management unit, an interface control unit, a data storage unit, a power protection unit and an intelligent unit. The power management unit is connected with a memory card voltage source of the near field communication device to receive a voltage from the memory card connection port. The interface control unit is connected with the power management unit and a memory card data input/output interface, wherein the interface control unit is supplied with power from the power management unit, receives data input and output from the memory card data input/output interface, and outputs an execute instruction. The data storage unit is a flash memory to store data, the data storage unit being connected with the interface control unit to receive the execute instruction for reading, writing and erasing data. The power protection unit is electrically connected with the power management unit and a near field voltage source of a near field communication unit, thereby preventing short-circuit induced by direct connection between the power management unit and the near field voltage source, and power leakage from the near field voltage source or the power management unit. The intelligent unit is connected with the power protection unit and a single wire protocol input/output interface. The intelligent unit is supplied with power from the power protection unit and is connected with the near field communication unit through the single wire protocol, wherein the intelligent unit receives a signal from an external near field communication device, is connected with the interface control unit, receives an instruction from the memory card data input/output interface, and encrypts/decrypts the instruction inputted or read from a single wire protocol input/output interface or the interface control unit to prevent transaction data from being stolen.

The power management unit, the interface control unit and the power protection unit can be formed as an independent chip, or at least two of the power management unit, the interface control unit and the power protection unit can be formed on a same chip.

The memory card described herein can have a Micro-SD standard size format, which can be used in a near field communication device such as mobile phones, cameras, multimedia players, tablet computers, etc. Because the power protection unit is interposed between the power management unit and the near field voltage source of the device, the occurrence of short-circuit due to direct electric connection can be prevented. Moreover, direct connection between the power management unit and the intelligent unit can also be prevented, which can protect against bursts of excessive voltages or currents that may damage the data in the intelligent unit. Additionally, the power protection unit can prevent power leakage from the power management unit and the near field voltage source, which solves the problem of improperly driving near field communication or insufficient power supply to the interface control unit or intelligent unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a block diagram of a memory card supporting near field communication through the Single Wire Protocol.

DETAILED DESCRIPTION OF THE PREFERRED EMBODIMENTS

FIG. 1 is a block diagram of a memory card supporting near field communication through the Single Wire Protocol (SWP) according to the present invention. The memory card 1 is mainly used for a device 100 that can perform near field communication, such as a mobile phone, a camera, a multimedia player, a tablet computer, etc. The device 100 comprises a memory card connection port 110 and a near field communication unit 120. The memory card connection port 110 includes a memory card voltage source 111 and a memory card data input/output (I/O) interface 113. The near field communication unit 120 includes a near field voltage source 121 and a Single Wire Protocol input/output (SWP I/O) interface 123.

The memory card 1 includes a power management unit 10, an interface control unit 20, a data storage unit 30, a power protection unit 40 and an intelligent unit 50. The power management unit 10 is connected with the memory card voltage source 111 of the device 100 to receive a voltage from the memory card connection port 110. The interface control unit 20 is connected with the power management unit 10, the memory card data 110 interface 113 and the intelligent unit 50, respectively. The power management unit 10 supplies power to the interface control unit 20. The interface control unit 20 inputs data from and output data to the memory card data 110 interface 113, and outputs an execute instruction. Based on the execute instruction, the interface control unit 20 can differentiate whether to control either of the intelligent unit 50 or the data storage unit 30. The data storage unit 30 is a flash memory that stores data, connects with the interface control unit 20, and receives an execute instruction from the interface control unit 20 to read, write and erase data. The intelligent unit 50 is an encryption/decryption circuit. The connection interface between the interface control unit 20 and the intelligent unit 50 can be ISO7816, SPI, GPIO, I2C and other communication interface.

The power protection unit 40 is electrically connected with the power management unit 10 and the near field voltage source 121 to prevent short-circuit caused by a direct connection between the power management unit 10 and the near field voltage source 121 of the near field communication unit 120. Moreover, the power protection unit 40 also prevents the near field voltage source 121 or the power management unit 10 from problems related to power leakage.

The intelligent unit 50 is connected with the power protection unit 40 and the SWP I/O interface 123, respectively. The intelligent unit 50 is powered by the power protection unit 40, and is connected with the near field communication unit 120 through SWP, so as to receive signals from the external near field communication device. The intelligent unit 50 can encrypt and decrypt the instruction of inputting or reading data from the SWP I/O interface 123, or the data inputted to or read from the interface control unit 20 to prevent transaction data from being stolen.

The power management unit 10, the interface control unit 20 and the power protection unit 40 can be respectively formed as three individual chips, or at least two of the power management unit 10, the interface control unit 20 and the power protection unit 40 can be formed on a same chip.

The memory card described herein can have a Micro-SD standard size format, which can be used in a near field communication device 100 such as mobile phones, cameras, multimedia players, tablet computers, etc. Because the power protection unit 40 is disposed between the power management unit 10 and the near field voltage source 121 of the near field communication device 100, the occurrence of short-circuit due to direct electric connection can be prevented. Moreover, the present invention also prevents direct connection between the power management unit 10 and the intelligent unit 50, which can protect against bursts of excessive voltages or currents that may damage the data in the intelligent unit 50. Additionally, the power protection unit 40 can prevent power leakage from the power management unit 10 and the near field voltage source 121, which solves the problem of incapability of driving near field communication or incapability of providing sufficient power to the interface control unit 20 or intelligent unit 50.

The foregoing description is intended to only provide illustrative ways of implementing the present invention, and should not be construed as limitations to the scope of the present invention. While the foregoing is directed to embodiments of the present invention, other and further embodiments of the invention may thus be devised without departing from the basic scope thereof, and the scope thereof is determined by the claims that follow.

What is claimed is:

1. A memory card supporting near field communication through single wire protocol, the memory card being suitable for use with a near field communication device having a memory card connection port and a near field communication unit, the memory card comprising:
   a power management unit connected with a memory card voltage source of the near field communication device to receive a voltage from the memory card connection port;
   an interface control unit connected with the power management unit and a memory card data input/output interface, wherein the interface control unit is powered by the power management unit, inputs data from and output data to the memory card data input/output interface, and outputs an execute instruction;
   a data storage unit, being a flash memory to store data, the data storage unit being connected with the interface control unit to receive the execute instruction for reading, writing and erasing data;
   a power protection unit electrically connected with the power management unit and a near field voltage source of the near field communication unit, thereby preventing short-circuit induced by direct connection between the power management unit and the near field voltage source, and power leakage from the near field voltage source or the power management unit; and
   an intelligent unit connected with the power protection unit and a single wire protocol input/output interface, the intelligent unit being powered by the power protection unit and connected with the near field communication unit through the single wire protocol, wherein the intelligent unit receives a signal from the external near field communication device, is connected with the interface control unit, receives an instruction from the memory card data input/output interface, is an encrypt/decrypt circuit, and encrypts and decrypts the instruction of inputting or reading data from the single wire protocol input/output interface or the data inputted to or read from the interface control unit to prevent transaction data from being stolen.

2. The memory card as claimed in claim 1, wherein the near field communication device comprises the memory card connection port and the near field communication unit, the memory card connection port comprises the memory card voltage source and the memory card data input/output interface, and the near field communication unit comprises the near field voltage source and the single wire protocol input/output interface.

3. The memory card as claimed in claim 1, wherein the near field communication device is a mobile phone, a camera, a multimedia player or a tablet computer.

4. The memory card as claimed in claim 1, wherein the power management unit, the interface control unit and the power protection unit are respectively formed on three individual chips.

5. The memory card as claimed in claim 1, wherein at least two of the power management unit, the interface control unit and the power protection unit are formed on a same chip.

6. The memory card as claimed in claim 1, wherein the memory card has a Micro-SD size format.

* * * * *